(12) United States Patent
Hachisuka et al.

(10) Patent No.: US 7,911,743 B2
(45) Date of Patent: Mar. 22, 2011

(54) MULTICHANNEL THIN-FILM MAGNETIC HEAD WITH DUMMY SHIELDS

(75) Inventors: Nozomu Hachisuka, Tokyo (JP); Yoshiyuki Mizoguchi, Tokyo (JP); Hiroshi Yamazaki, Tokyo (JP); Hideaki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 868 days.

(21) Appl. No.: 11/849,636

(22) Filed: Sep. 4, 2007

(65) Prior Publication Data

US 2009/0059439 A1     Mar. 5, 2009

(51) Int. Cl.
*G11B 5/31* (2006.01)
(52) U.S. Cl. ....................................................... 360/316
(58) Field of Classification Search .................. 360/316
See application file for complete search history.

(56) References Cited

U.S. PATENT DOCUMENTS

| 7,486,476 | B2* | 2/2009 | Biskeborn | 360/121 |
| 7,548,397 | B2* | 6/2009 | Biskeborn et al. | 360/121 |
| 7,773,347 | B2* | 8/2010 | Maejima et al. | 360/316 |

FOREIGN PATENT DOCUMENTS

JP   A 09-016910   1/1997

* cited by examiner

*Primary Examiner* — Mark Blouin
(74) *Attorney, Agent, or Firm* — Oliff & Berridge, PLC

(57) ABSTRACT

Provided is a multichannel thin-film magnetic head having a plurality of read head elements neighboring with each other, each of which includes shield layers having a desired stable magnetic-domain structure. The head comprises at least one read head part comprising a plurality of read head elements aligned in the track width direction, wherein each of the plurality of read head elements comprises a lower shield layer and an upper shield layer, and the at least one read head part comprises: a lower shield part comprising a plurality of the lower shield layers aligned in the track width direction; and an upper shield part comprising a plurality of the upper shield layers aligned in the track width direction, and wherein dummy shield layers are provided respectively on both sides of at least the lower shield part.

10 Claims, 5 Drawing Sheets

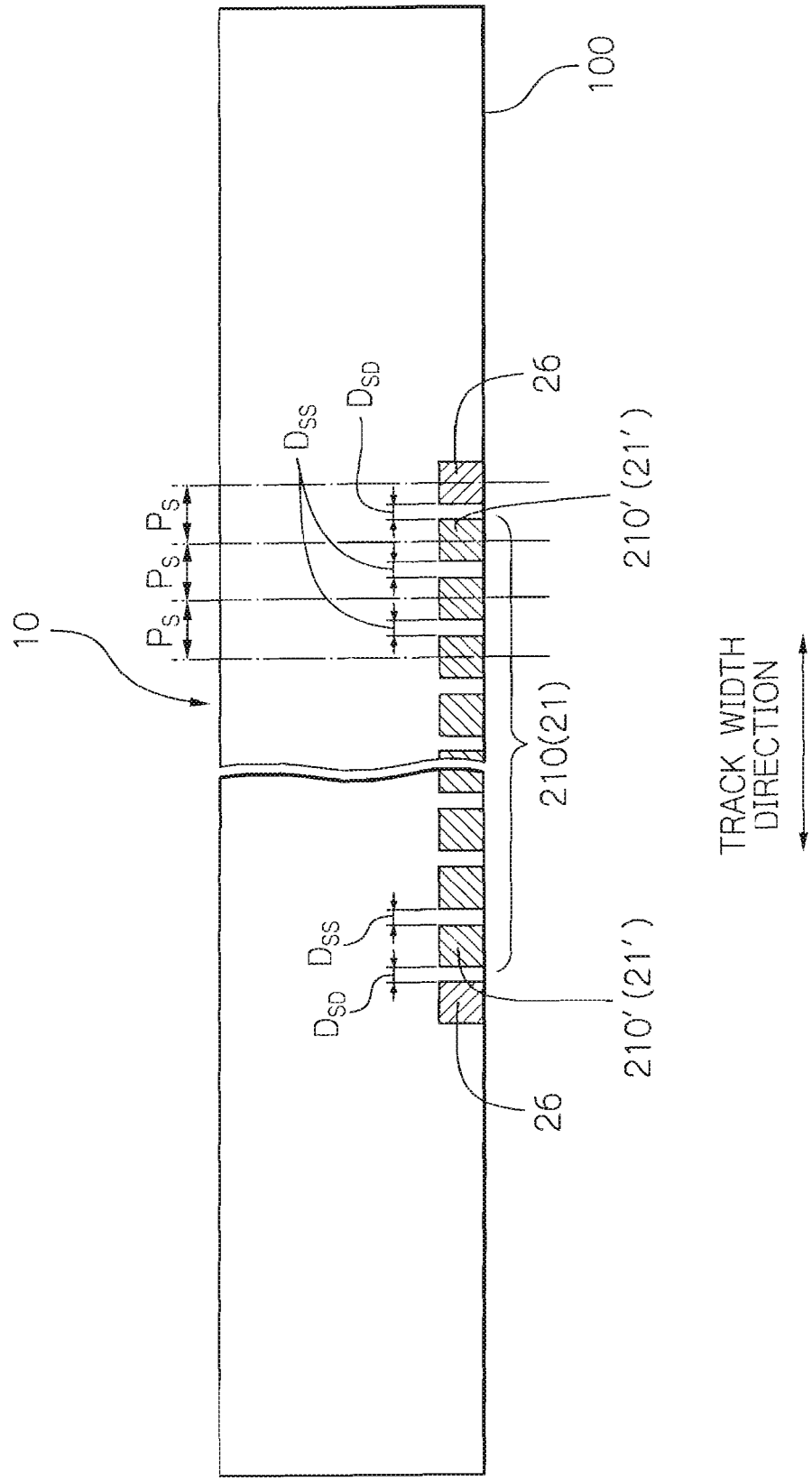

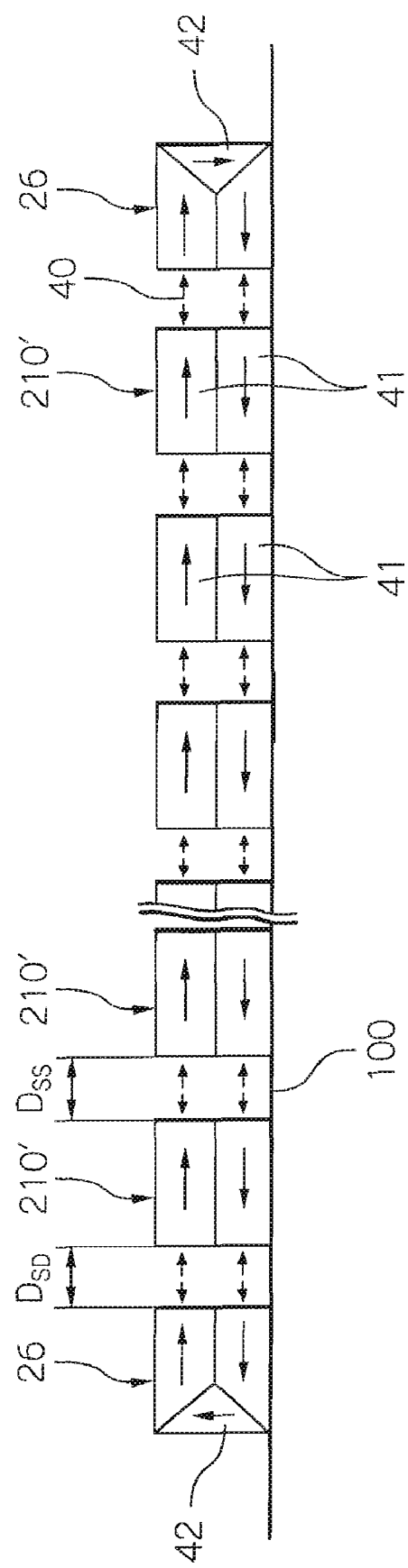

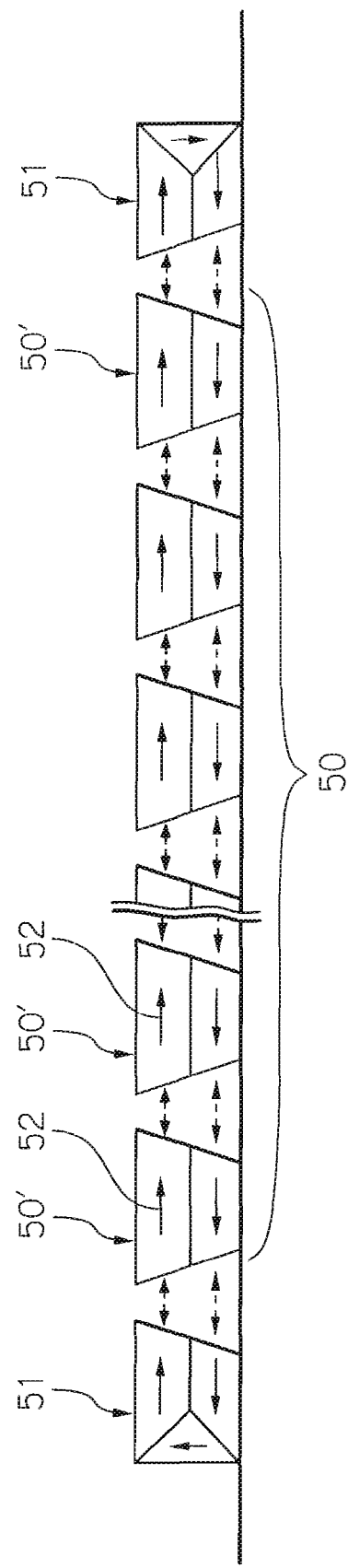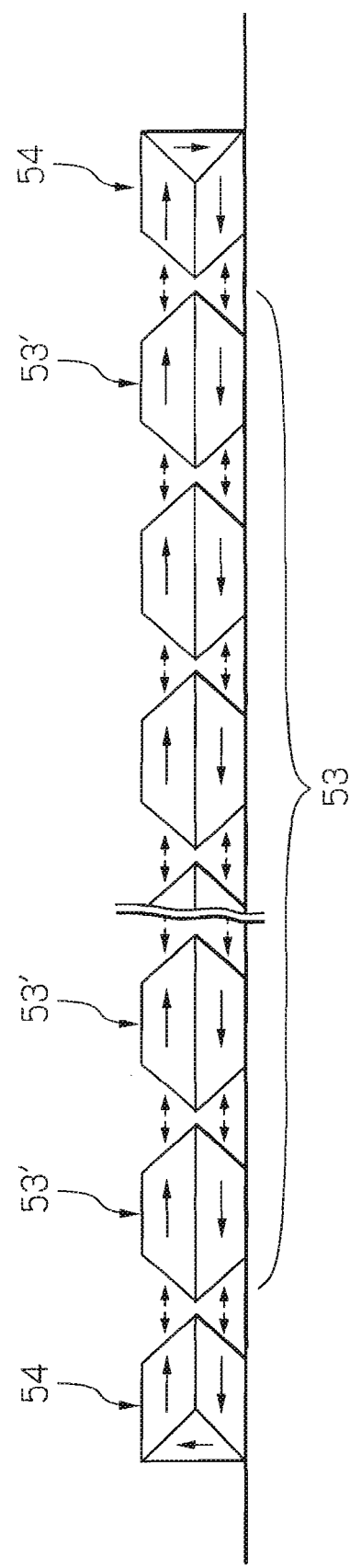

MULTICHANNEL THIN-FILM MAGNETIC HEAD WITH DUMMY SHIELDS

BACKGROUND OF THE INVENTION

1. Field of the Invention

The present invention relates to a thin-film magnetic head for applying to a magnetic recording technique, especially to a tape head for reading data from a magnetic tape and writing data to the tape. The present invention further relates to a magnetic tape apparatus provided with the tape head.

2. Description of the Related Art

In recent years, magnetic recording and reproducing apparatuses have been remarkably improved in capacity of storage data. And magnetic tape apparatuses for backing up or storing data are no exception of this trend of larger capacity, and have been required to be improved in areal recording density and to have multichannel configuration, corresponding to the larger capacity.

Thin-film magnetic heads, which are widely used for the above-described magnetic recording and reproducing apparatuses, write data to a magnetic recording medium and read data from the medium. The thin-film magnetic heads have also been strongly required to be miniaturized and to be improved in performance, corresponding to the larger capacity. For example, the thin-film magnetic head for the magnetic tape apparatus (tape head) includes a read head part and a write head part in which a plurality of read head elements and write head elements are aligned along the track width direction, respectively, in order to realize the multichannel configuration and to perform read and write operations to multiple tracks.

As a result, especially in some cases of such tape heads, the read head elements are likely to interact with one another to cause a negative effect on their read characteristics. For example, a magnetoresistive (MR) element, which is usually used as a read head element, has shield layers for shielding an MR multilayer that is a magneto-sensitive portion from external magnetic fields as a noise. The shield layers are required to have a stable magnetic-domain structure in order to obtain adequate resistance changes according to signal magnetic fields during read operation. However, in some cases that the shield layers come close to each other corresponding to the multichannel configuration, a required stable magnetic-domain structure is likely not to be obtained due to the interference among magnetic-domains of individual shield layers. In this occasion, the problem such as a noise in the read output or an insufficient read output is likely to occur.

As a measure for stabilizing the magnetic-domain structure of the shield layers, there is a configuration in which the MR elements are sufficiently distant from each other. However, such a configuration cannot meet the trend of smaller track pitch according to the above-described improvement in areal recording density and multichannel configuration. As another measure, for example, Japanese Patent Publication No. 9-16910A describes a head assembly, in which one common magnetic pole is used instead of the lower magnetic poles of a plurality of heads, and further shields are provided between the heads. However, in some cases that one common shield layer is provided instead of a plurality of upper or lower shield layers as an application of the just-described technique, a cross-talk between the adjacent MR elements or an electrostatic discharge between upper and lower shield layers has a possibility to occur. The electrostatic discharge to break the elements have a potential to occur in the case that the opposed area of the upper and lower shield layers becomes larger as the area of each shield layer becomes larger. Further, the common shield layer has a closure magnetic-domain structure as a whole. As a result, formed are magnetic domains in both end portions in the track width direction, each of which has a magnetization with a direction in-plane and perpendicular to the track width direction. Such magnetic domains are likely to cause a noise in the read output or an unstable output.

BRIEF SUMMARY OF THE INVENTION

Therefore, an object of the present invention is to provide a multichannel thin-film magnetic head having a plurality of read head elements neighboring with each other, each of which includes shield layers having a desired stable magnetic-domain structure, and is further to provide a magnetic tape apparatus provided with the multichannel thin-film magnetic head(s).

Before describing the present invention, terms used herein will be defined. In a multilayer structure of element(s) formed on/above the element formation surface of the substrate in a thin-film magnetic head, a layer located on the substrate side in relation to a standard layer is referred to as being located "lower" than, "beneath" or "below" the standard layer, and a portion of a layer on the substrate side is referred to as a "lower" portion. Further, a layer located on the stacking direction side (the opposite side to the substrate) in relation to a standard layer is referred to as being located "upper" than, "on" or "above" the standard layer, and a portion of a layer on the stacking direction side is referred to as an "upper" portion.

According to the present invention, a thin-film magnetic head is provided, which comprises at least one read head part comprising a plurality of read head elements aligned in a track width direction, wherein each of the plurality of read head elements comprises a lower shield layer and an upper shield layer, and the at least one read head part comprises: a lower shield part comprising a plurality of the lower shield layers aligned in the track width direction; and an upper shield part comprising a plurality of the upper shield layers aligned in the track width direction, and wherein dummy shield layers are provided respectively on both sides in the track width direction of at least the lower shield part out of the lower shield part and the upper shield part.

In the just-described thin film magnetic head, the whole of the dummy shield layers and a plurality of the shield layers act as a single magnetic layer and have a closure magnetic domain structure. This configuration enables each of the shield layers, which shields an MR multilayer for performing actual reading, to have a 180° magnetic domain structure that supports an excellent response to signal magnetic fields of the MR multilayer, but to have no 90° magnetic domain walls that may cause a noise in the read output or lower output. As a result, an excellent read output with the noise suppressed and with sufficient intensity can be obtained with relation to every one of the multiple tracks.

In the thin film magnetic head according to the present invention, the dummy shield layers are preferably provided respectively on both sides in the track width direction of each of the lower shield part and the upper shield part. And a distance between the dummy shield layer and the upper/lower shield layer and a distance between the upper/lower shield layers are preferably set to be in a range where respective magnetizations of magnetic domains in the layers interact with each other between the layers. Here, in the case, it is preferable that the distances are set so that each of the upper/lower shield layers has only domains with magnetization directed in the track width direction, and each of the dummy shield layers has a domain with magnetization directed perpendicular to the track width direction. Especially, it is also preferable that the distance between the dummy shield layer and the upper/lower shield layer and the distance between the upper/lower shield layers are at least 8.5 μm (micrometers).

Further, in the thin film magnetic head according to the present invention, each of the dummy shield layers and the upper/lower shield layers preferably has a rectangular shape. And it is also preferable that each of the upper/lower shield layers has a shape with protruded portions on both sides in the track width direction, and the upper/lower shield layers are aligned so that the protruded portions of the adjacent upper/lower shield layers are opposed to each other. In this case, it is preferable that each of the upper/lower shield layers has a trapezoidal shape with a longer edge extending in the track width direction, and the upper/lower shield layers are aligned so that the longer edges are aligned close to each other. By using the just-described configuration, in the upper/lower shield layers adjacent to each other, the magnetizations of respective layers are more strongly coupled with each other, which realizes more stable domain structure of the upper/lower shield part. Further, the lower shield layer is preferably formed of a material including Sendust.

According to the present invention, a magnetic tape apparatus is further provided, which comprises:

at least one thin-film magnetic head comprising at least one read head part comprising a plurality of read head elements aligned in a track width direction; and a magnetic tape including a plurality of tracks, the plurality of read head elements reading data signals from each of the plurality of tracks, wherein each of the plurality of read head elements comprises a lower shield layer and an upper shield layer, and the at least one read head part comprises: a lower shield part comprising a plurality of the lower shield layers aligned in the track width direction; and an upper shield part comprising a plurality of the upper shield layers aligned in the track width direction, and wherein dummy shield layers are provided respectively on both sides in the track width direction of at least the lower shield part out of the lower shield part and the upper shield part.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIG. 2 shows a cross-sectional view taken along plane B shown in FIG. 1a, illustrating a main portion of one embodiment of a thin-film magnetic head according to the present invention;

FIG. 4 shows a cross-sectional view taken along plane B shown in FIG. 1a, explaining the aspect of the between-layers interaction of the respective magnetizations of the magnetic domains in the lower dummy shield layers and a plurality of the lower shield layers; and FIGS. 5a and 5b show cross-sectional views taken along plane B shown in FIG. 1a, explaining alternatives of the configuration with the dummy shield layers according to the present invention.

DETAILED DESCRIPTION OF THE INVENTION

Figure 1A:
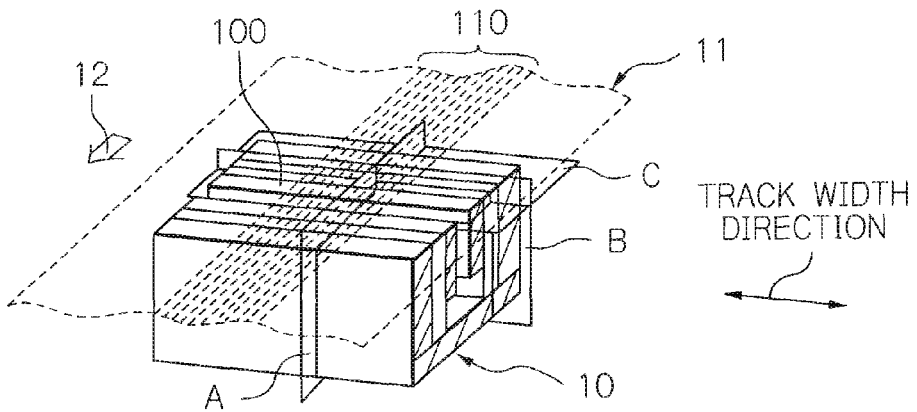
FIG. 1a shows a perspective view schematically illustrating the configuration of one embodiment of a thin-film magnetic head according to the present invention.
Figure 1B:
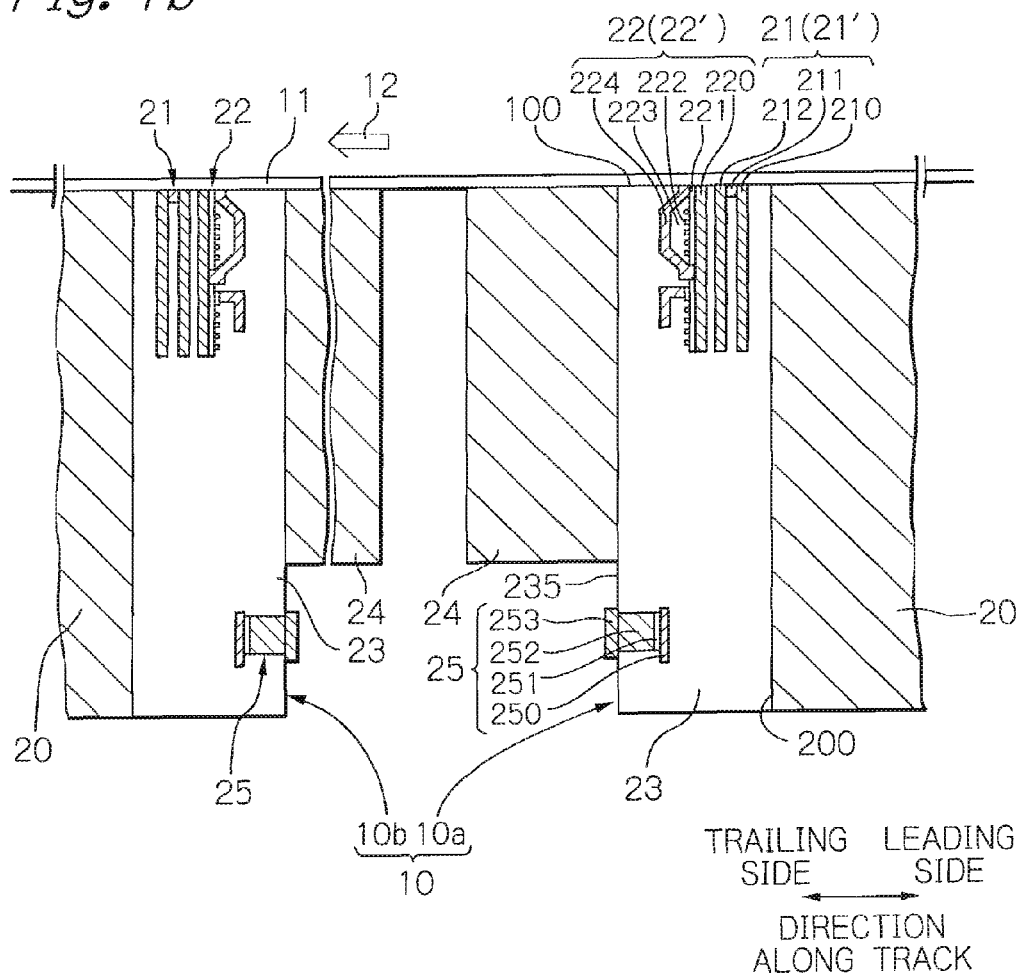
FIG. 1b shows a cross-sectional view taken along plane A shown in FIG. 1a, illustrating a main portion of one embodiment of a thin-film magnetic head according to the present invention.

FIG. 1a shows a perspective view schematically illustrating the configuration of one embodiment of a thin-film magnetic head according to the present invention. And FIG. 1b shows a cross-sectional view taken along plane A shown in FIG. 1a, illustrating a main portion of one embodiment of a thin-film magnetic head according to the present invention. In FIG. 1b, a terminal electrode 25 does not really appear on the cross-section taken along the plane A, however, is presented on the cross-section for convenience of explanation.

In FIG. 1a, reference numeral 10 indicates a tape head as a thin-film magnetic head for used with a magnetic tape, and 11 indicates a magnetic tape as a magnetic recording medium having a plurality of tracks 110, respectively. During write and read operations, the magnetic tape 11 moves in the direction of an arrow 12. The tape head 10 performs data-reading and data-writing operations to the tracks 110 of the magnetic tape 11.

As shown in FIG. 1b, the tape head 10 includes a leading part 10a and a trailing part 10b. The leading part 10a and the trailing part 10b are opposed with each other in the direction along the track, and have the common structure corresponding to each other. Therefore, only the leading part 10a will be explained below. As a matter of course, a configuration in which the tape head 10 includes either the leading part 10a or the trailing part 10b is within the scope of the present invention.

The leading part 10a of the tape head 10 includes: a head substrate 20 made of, for example, AlTiC ($Al_2O_3$—TiC), having an element formation surface 200 perpendicular to an opposed-to-medium surface 100; a read head part 21 for reading data signals, formed on/above the element formation surface 200; a write head part 22 for writing data signals, formed directly above the read head part 21; an overcoat layer 23 formed on the element formation surface 200 so as to cover the read head part 21 and the write head part 22; a closure 24 made of, for example, AlTiC ($Al_2O_3$—TiC), adhering to a portion of the upper surface 235 of the overcoat layer 23, the other portion of the upper surface 235 being exposed; and a plurality of terminal electrodes 25 formed in the exposed portion of the upper surface 235 of the overcoat layer 23.

The read head part 21 and the write head part 22 are electrically connected with a plurality of terminal electrodes 25. Further, one ends of the read head part 21 and the write head part 22 reach the opposed-to-medium surface 100 and have contact with the magnetic tape 11. In the just-described configuration, during read and write operations, the write head part 22 writes by applying signal magnetic fields to the moving magnetic tape 10, and the read head part 21 reads by sensing signal magnetic fields from the moving magnetic tape 10.

The read head part 21 has a structure in which a plurality of MR elements 21' are aligned in the track width direction. Each of the MR elements 21' reads data signals from each of a plurality of tracks 110, to realize a multichannel configuration. In FIG. 1b, only one of the MR elements 21' appears. As shown in FIG. 1b, each of the MR element 21' includes: an MR multilayer 211; and a lower shield layer 210' and an upper shield layer 212', disposed so as to sandwich the MR multilayer therebetween. Therefore, the read head part 21 includes: a lower shield part 210 having a plurality of lower shield layers 210' aligned in the track width direction; and an upper shield part 212 having a plurality of upper shield layers 212' aligned in the track width direction. The upper and lower shield layers 212' and 210' act for preventing the MR multilayer 211 from receiving an external magnetic field as a noise. Each of the upper and lower shield layers 212' and 210' is a magnetic layer formed of, for example, FeSiAl (Sendust), NiFe (Permalloy), CoFeNi, CoFe, FeN, FeZrN or CoZrTaCr, or a multilayer of these materials with thickness of approximately 0.5 to 3 μm (micrometers), made by using, for example, a frame plating method or a sputtering method.

The MR multilayer 211 is a magneto-sensitive portion for sensing signal magnetic fields by utilizing an MR effect, and may be, for example, an anisotropic magnetoresistive (AMR) multilayer that utilizes an AMR effect, a giant magnetoresistive (GMR) multilayer that utilizes a GMR effect, or a tunnel magnetoresistive (TMR) multilayer that utilizes a TMR effect. Further, in the case of the GMR multilayer, the MR multilayer 211 may be a current-in-plane giant magnetoresistive (CIP-GMR) multilayer, or a current-perpendicular-to-plane giant magnetoresistive (CPP-GMR) multilayer. Any MR multilayer 211 utilizing one of these MR effects senses signal magnetic fields from the magnetic tape 11 with high sensitivity. In the case that the MR multilayer 211 is a CPP-GMR multilayer or a TMR multilayer, the upper and lower shield layers 212' and 210' also act as electrodes. Whereas, in the case that the MR multilayer 211 is an AMR multilayer or a CIP-GMR multilayer, insulating layers are provided between the MR multilayer 211 and respective upper and lower shield layers 212' and 210', and further, MR lead layers are provided to be electrically connected with the MR multilayer 211.

The write head part 22 has a structure in which a plurality of electromagnetic transducers 22' are aligned in the track width direction on/above a plurality of MR elements 21'. In FIG. 1b, only one of the electromagnetic transducers 22' appears. As shown in FIG. 1b, each of the electromagnetic transducers 22' includes: a lower magnetic pole layer 220; an upper magnetic pole layer 224; a write gap layer 221, the end portion on the opposed-to-medium surface 100 side of the write gap layer 221 being sandwiched between the lower magnetic pole layer 220 and the upper magnetic pole layer 224; a write coil layer 222 formed so as to pass through in every turn at least between the upper and lower magnetic pole layers 224 and 220; and a coil insulating layer 223 for isolating the write coil layer 222 from the upper and lower magnetic pole layers 224 and 220. That is, the write head part 22 has a configuration in which a plurality of lower magnetic pole layers 220 aligned in the track width direction and a plurality of upper magnetic pole layers 224 also aligned in the track width direction, make a pair with each other.

The lower magnetic pole layer 220 and the upper magnetic pole layer 224 act as a path of the magnetic flux excited by a write current flowing through the write coil layer 222. And one end portions of the upper and lower magnetic pole layers 224 and 220 sandwich the end portion on the opposed-to-medium surface 100 side of the write gap layer 221. Leakage magnetic fields from the sandwiched end portion of the write gap layer 221 perform writing. In FIG. 1b, the write coil layer 222 has a monolayer structure, however, may have a two or more layered structure or a helical coil shape. Further, the upper shield layer 212' and the lower magnetic pole layer 220 may be substituted with one magnetic layer.

The lower magnetic pole layer 220 is a magnetic layer formed of, for example, NiFe (Permalloy), CoFeNi, CoFe, FeN FeZrN or CoZrTaCr, or a multilayer of these materials with thickness of approximately 0.5 to 3 μm, made by using, for example, a frame plating method or a sputtering method. The write gap layer 221 is a non-magnetic layer formed of, for example, $Al_2O_3$ (alumina), $SiO_2$ (silicon dioxide), AlN (aluminum nitride) or DLC (diamond-like carbon) with thickness of approximately 0.01 to 0.05 μm, made by using, for example, a sputtering method or a chemical vapor deposition (CVD) method. The write coil layer 222 is a conductive layer formed of, for example, Cu with thickness of approximately 0.5 to 5 μm, made by using, for example, a frame plating method or a sputtering method. The coil insulating layer 223 is, for example, an insulating resin layer formed of, for example, a heat-cured photoresist such as novolac based with thickness of approximately 0.7 to 7 μm, made by using, for example, a photolithography method. The upper magnetic pole layer 224 is a magnetic layer formed of, for example, NiFe (Permalloy), CoFeNi, CoFe, FeN FeZrN or CoZrTaCr, or a multilayer of these materials with thickness of approximately 0.5 to 3 μm, made by using, for example, a frame plating method or a sputtering method. The overcoat layer 23 is formed of, for example, stacked non-magnetic insulating materials such as $Al_2O_3$ (alumina), $SiO_2$ (silicon dioxide), AlN (aluminum nitride) or DLC, made by using, for example, a sputtering method or a CVD method.

The terminal electrode 25 includes a lead electrode 250, a base electrode film 251, a bump 252 and a pad 253. The lead electrode 250 is electrically connected with a lead line extending from the MR element 21', the electromagnetic transducer 22' or a RLG element. On the lead electrode 250, formed is the base electrode film 251 with conductivity, and the bump 252 is formed by using a plating method with the base electrode film 251 as an electrode. The base electrode film 251 and the bump 252 are formed of a conductive material such as Cu. The base electrode film 251 has a thickness of approximately 10 to 200 nm (nanometers), and the bump 252 has a thickness of approximately 5 to 30 μm. The top end of the bump 252 is exposed in the upper surface 235 of the overcoat layer 23. And on the top end of the bump, formed is the pad 253.

Figure 3:
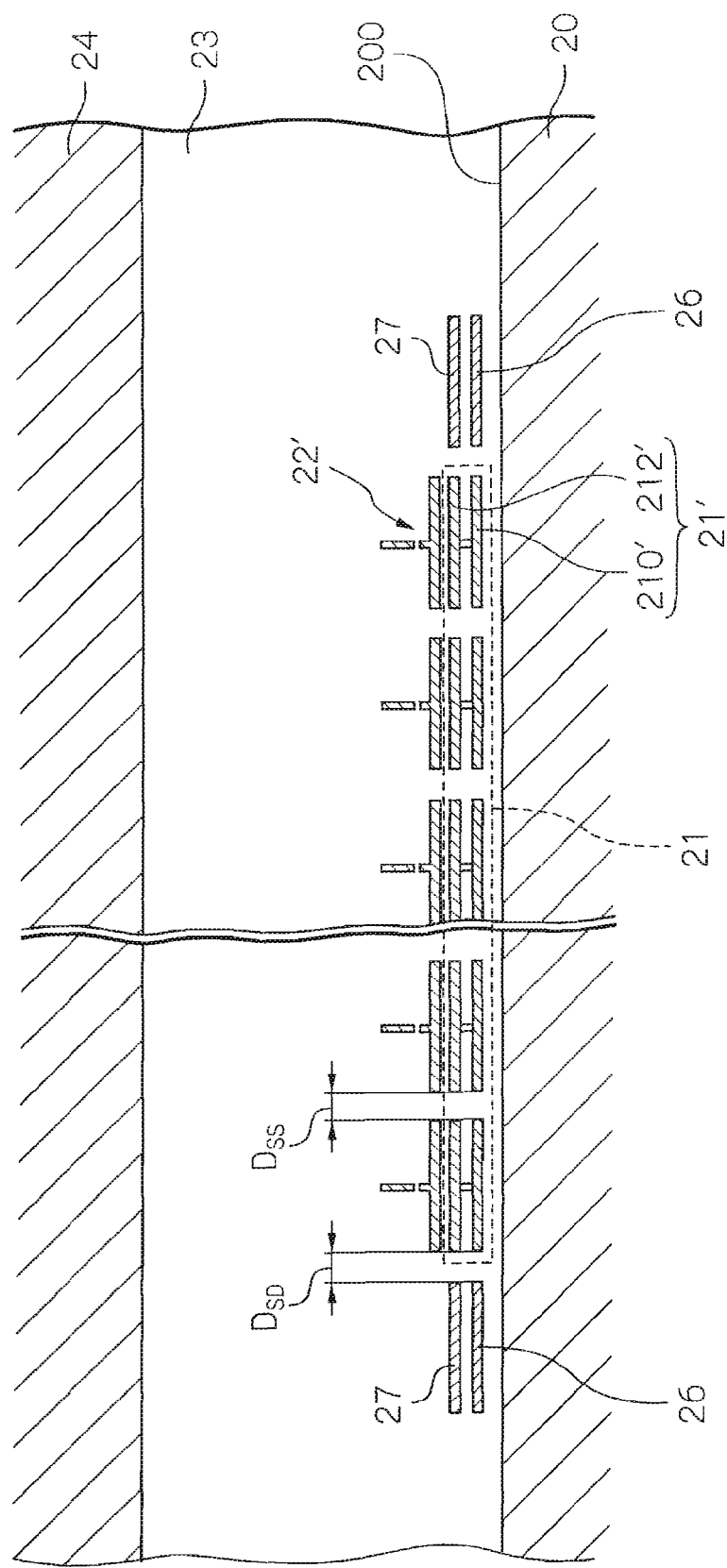
FIG. 3 shows a cross-sectional view taken along plane C shown in FIG. 1a, illustrating a main portion of one embodiment of a thin-film magnetic head according to the present invention.

FIG. 2 shows a cross-sectional view taken along plane B shown in FIG. 1a, illustrating a main portion of one embodiment of a thin-film magnetic head according to the present invention. In FIG. 2, the whole of a plurality of lower shield layers 210' appear on the cross-section. And FIG. 3 shows a cross-sectional view taken along plane C shown in FIG. 1a, illustrating a main portion of one embodiment of a thin-film magnetic head according to the present invention.

As shown in FIG. 2, a chip of the tape head 10 has an elongate rectangular shape extending in the track width direction. In the tape head 10, the read head part 21 is formed in the central region in the track width direction so as to reach the opposed-to-medium surface 100. The read head part 21 includes a plurality of the MR elements 21' aligned in the track width direction. Take notice that, in FIG. 2, appears only the lower shield part 210 having a plurality of the lower shield layers 210', in the MR elements 21'. The number of the MR elements 21' can be set according to the number of tracks 110 on the magnetic tape 11. For example, the number of the MR elements 21' may be one in the case of a single track, or may be eight in the case of eight tracks. Further, in the case of 16 data tracks and two servo tracks positioned respectively on both sides of the data tracks, eighteen MR elements 21' may be provided, which include two MR elements for reading from the two servo tracks. In this case, the lower shield part 210 includes eighteen lower shield layers 210'.

Further, two lower dummy shield layers 26 are provided respectively on both sides in the track width direction of the lower shield part 210 having a plurality of lower shield layers 210'. In this embodiment, the lower shield layers 210' and the lower dummy shield layers 26 have a rectangular shape. The lower dummy shield layer 26 may be formed of, for example, the same magnetic material as the lower shield layer 210' and may have the same thickness as the layer 210'. The lower dummy shield layer 26, the lower shield layer 210' and the upper shield layer 212' have a size of, for example, approximately 115×115 μm² and a thickness of, for example, approximately 1.8 to 2 μm. The lower dummy shield layers 26 and the lower shield layers 210' may be aligned with a certain pitch $P_S$.

Further, the distance $D_{SD}$ between the lower dummy shield layer 26 and the adjacent lower shield layer 210' and the distance $D_{SS}$ between the lower shield layers 210' adjacent to each other are set to be sufficiently small, that is, to be in the range where respective magnetizations of the magnetic domains in the layers interact with each other between the layers. The aspect of the between-layers interaction of the respective magnetizations of the magnetic domains will be explained by using FIG. 4 layer. Specifically, these distances $D_{SD}$ and $D_{SS}$ are preferably at least 8.5 μm. If the distances $D_{SD}$ and $D_{SS}$ are less than 8.5 μm, the spacing between the lower dummy shield layer 26 and the adjacent lower shield layer 210' and the spacing between the lower shield layers 210' adjacent to each other cannot sufficiently be filled with a non-magnetic insulating material such as $Al_2O_3$ (alumina) in the manufacturing process. Whereas, if the distances $D_{SD}$ and $D_{SS}$ become much larger, respective magnetizations of the magnetic domains in the layers cannot sufficiently interact with each other between the layers, which has been proved from the observation performed by using a domain scope utilizing Kerr effect. Therefore, the upper limits of the distances $D_{SD}$ and $D_{SS}$ are determined as their maximum values with which the whole of the lower dummy shield layers 26 and the lower shield layers 210' has a closure magnetic-domain structure, as if the whole is a single magnetic layer. Actually, sufficiently small distances $D_{SD}$ and $D_{SS}$ are set so that a total magnetic potential energy is reduced by compensating the increased amount of demagnetizing energy generated in the case that only 180° magnetic domains are formed in each of the lower shield layers 210'.

Meanwhile, FIG. 2 shows the lower shield part 210 having the lower dummy shield layers 26 and a plurality of the lower shield layers 210'; however, two upper dummy shield layers 27 may be preferably provided respectively on both sides in the track width direction of the upper shield part 212 having a plurality of upper shield layers 212'; and further, the upper dummy shield layers 27 and a plurality of upper shield layers 212' may be aligned in the same way as that explained above with FIG. 2. That is, as shown in FIG. 3, dummy shield layers 26 and 27 may be preferably provided on both sides in the track width direction of the lower shield part 210 and the upper shield part 212, respectively. Here, FeSiAl (Sendust) with higher hardness than that of such as NiFe (Permalloy) can be used for a constituent material of the lower shield layer 210'. However, it is comparatively difficult to control the magnetic domains in a FeSiAl layer. Therefore, in the case of using FeSiAl, providing the lower dummy shield layers 26 according to the present invention becomes significantly effective in controlling the magnetic domains.

FIG. 4 shows a cross-sectional view taken along plane B shown in FIG. 1a, explaining the aspect of the between-layers interaction of the respective magnetizations of the magnetic domains in the lower dummy shield layers 26 and a plurality of the lower shield layers 210'.

As described above, the spacing between the lower dummy shield layer 26 and the adjacent lower shield layer 210' and the spacing between the lower shield layers 210' adjacent to each other are set to be distances $D_{SD}$ and $D_{SS}$ with sufficiently small values. Therefore, the magnetizations of the magnetic domains perform between-layers interactions 40. As a result, as shown in FIG. 4, the whole of the lower dummy shield layers 26 and the lower shield layers 210' has a closure magnetic-domain structure, as if the whole is a single magnetic layer. That is, the lower shield layer 210' has 180° magnetic domains 41 which have magnetizations with directions opposed to each other along the track width, whereas the lower dummy shield layer 26 has a domain structure including a 90° magnetic domain 42 which has a magnetization directed perpendicular to the track width direction. Thus, the lower shield layers 210', each of which shields the MR multilayer 211 that actually performs reading, do not have a 90° domain wall which has a possibility to cause a noise in the read output or an unstable output, but has a 180° magnetic domain structure which supports a favorable response to signal magnetic fields of the MR multilayer 211. As a result, an excellent read output with noise suppressed and with sufficient intensity can be realized with respect to all the multiple tracks.

Further, in the case that the upper dummy shield layers 27 are provided respectively on both sides in the track width direction of a plurality of upper shield layers 212', the whole of the upper dummy shield layers 27 and a plurality of upper shield layers 212' has the same magnetic domain structure as that shown in FIG. 4 to contribute a great deal to the realization of excellent read output.

As described above, the formation of closure magnetic-domain structure in the whole of the dummy shield layers and the shield layers, as if in a single magnetic layer, requires sufficiently small distances $D_{SD}$ and $D_{SS}$ so that compensated is the increased amount of demagnetizing energy generated in the case that only 180° magnetic domains are formed in each of the shield layers.

In the present invention, the shield layers positively interact with each other and act as a single magnetic layer, and further, the dummy shield layers are provided respectively on both sides in the track width direction of the shield part having a plurality of shield layers, as the measure to the closure magnetic domains.

Meanwhile, the magnetic domain structure shown in FIG. 4 corresponds to one of ideal aspects. Actually, a 180° domain wall may somewhat tilt relative to the track width direction, or three or more magnetic domains may be formed in the shield layers. Even in such cases, the combination of the dummy shield layers and the multiple shield layers with the above-described characteristic magnetic domain structure is clearly within the scope of the present invention.

FIGS. 5a and 5b show cross-sectional views taken along plane B shown in FIG. 1a, explaining alternatives of the configuration with the dummy shield layers according to the present invention.

As shown in FIG. 5a, each of a plurality of upper or lower shield layers 50' which constitute an upper or lower shield part 50 has a trapezoidal shape with a longer edge in the track width direction. In the figure, the upper or lower shield layer 50' has an isosceles trapezoidal shape with a shorter edge reaching the opposed-to-medium surface 100, in order to correspond to narrower track width. However, the longer edge may reach the opposed-to-medium surface 100 instead of the short edge. Further, the longer edges are aligned in the track width direction close to each other. As a result, in the upper or lower shield layers 50' adjacent to each other, the magnetizations 52 of magnetic domains on the longer-edge side are more strongly coupled with each other, which realizes more stable domain structure of the upper or lower shield part 50. Furthermore, the upper or lower dummy shield layers 51 are provided respectively on both sides in the track width direction of the upper or lower shield part 50. The longer edges of the dummy shield layers 51 and of the upper or lower shield layers 50' are aligned in the track width direction. From the just-described configuration, the whole of the upper or lower dummy shield layers 51 and the upper or lower shield part 50 can have a single closure magnetic domain structure.

The embodiment in which the upper or lower shield layers positively interact with each other is not limited to that shown in FIG. 5a. The upper or lower shield layers can positively interact with each other, in the case that each of the upper or lower shield layers has protruded portions on both sides in the track width direction, and the upper or lower shield layers are aligned so that the protruded portions of the adjacent upper or lower shield layers are opposed to each other. For example, as shown in FIG. 5b, each of a plurality of the upper or lower shield layers 53' constituting the upper or lower shield part 53 has a hexagonal shape with protruded corners on both sides in the track width direction. Also in this case, the upper or lower dummy shield layers 54 with a protruded portion opposed to other protruded portion are provided respectively on both sides in the track width direction of the upper or lower shield part 53.

Meanwhile, the magnetic domain structures shown in FIGS. 5a and 5b correspond to one of ideal aspects. Actually, a 180° domain wall may somewhat tilt relative to the track width direction, or three or more magnetic domains may be formed in the shield layers. Even in such cases, the combination of the upper or lower dummy shield layers and the multiple upper or lower shield layers with the above-described characteristic magnetic domain structure is clearly within the scope of the present invention.

In the thin film magnetic head according to the present invention, as explained above by using the embodiments and alternatives, the shield layers positively interact with each other and act as a single magnetic layer; and further, the dummy shield layers are provided respectively on both sides in the track width direction of the shield part having a plurality of shield layers, as the measure to the closure magnetic domains. This configuration enables each of the shield layers to have a 180° magnetic domain structure that supports an excellent response to signal magnetic fields of the MR multilayer, but to have no 90° magnetic domain walls that may cause a noise in the read output or lower output. As a result, an excellent read output with the noise suppressed and with sufficient intensity can be obtained with relation to every one of the multiple tracks. Further, in the present invention's structure provided with the dummy shield layers, a plurality of shield layers are not integrated into one, but consistently interact with each other positively. Therefore, a cross-talk between the adjacent MR elements or the breaking of elements by an electrostatic discharge between upper and lower shield layers can be avoided.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising at least one read head part comprising a plurality of read head elements aligned in a track width direction,
    each of said plurality of read head elements comprising a lower shield layer and an upper shield layer, and said at least one read head part comprising: a lower shield part comprising a plurality of the lower shield layers aligned in the track width direction; and an upper shield part comprising a plurality of the upper shield layers aligned in the track width direction,
    dummy shield layers being provided respectively on both sides in the track width direction of at least said lower shield part out of said lower shield part and said upper shield part, and
    the whole of said dummy shield layers and said lower/upper shield part having a closure magnetic-domain structure to act as a single magnetic layer.

2. The thin-film magnetic head as claimed in claim 1, wherein said dummy shield layers are provided respectively on both sides in the track width direction of each of said lower shield part and said upper shield part.

3. A thin-film magnetic head comprising at least one read head part comprising a plurality of read head elements aligned in a track width direction,
    each of said plurality of read head elements comprising a lower shield layer and an upper shield layer, and said at least one read head part comprising: a lower shield part comprising a plurality of the lower shield layers aligned in the track width direction; and an upper shield part comprising a plurality of the upper shield layers aligned in the track width direction,
    dummy shield layers being provided respectively on both sides in the track width direction of at least said lower shield part out of said lower shield part and said upper shield part, and
    a distance between the dummy shield layer and the upper/lower shield layer and a distance between the upper/lower shield layers being set to be in a range where respective magnetizations of magnetic domains in the layers interact with each other between the layers.

4. The thin-film magnetic head as claimed in claim 3, wherein the distances are set so that each of said upper/lower shield layers has only magnetic domains with magnetization directed in the track width direction, and each of said dummy shield layers has a magnetic domain with magnetization directed perpendicular to the track width direction.

5. The thin-film magnetic head as claimed in claim 3, wherein said distance between the dummy shield layer and the upper/lower shield layer and said distance between the upper/lower shield layers are at least 8.5 micrometers.

6. The thin-film magnetic head as claimed in claim 1, wherein each of said dummy shield layers and the upper/lower shield layers has a rectangular shape.

7. The thin-film magnetic head as claimed in claim 1, wherein each of the upper/lower shield layers has a shape with protruded portions on both sides in the track width direction, and the upper/lower shield layers are aligned so that said protruded portions of the adjacent upper/lower shield layers are opposed to each other.

8. The thin-film magnetic head as claimed in claim 7, wherein each of the upper/lower shield layers has a trapezoidal shape with a longer edge extending in the track width direction, and the upper/lower shield layers are aligned so that the longer edges are aligned close to each other.

9. The thin-film magnetic head as claimed in claim 1, wherein said lower shield layer is formed of a material including Sendust.

10. A magnetic tape apparatus comprising:
   at least one thin-film magnetic head comprising at least one read head part comprising a plurality of read head elements aligned in a track width direction; and
   a magnetic tape including a plurality of tracks, said plurality of read head elements reading data signals from each of said plurality of tracks,
   each of said plurality of read head elements comprising a lower shield layer and an upper shield layer, and said at least one read head part comprising: a lower shield part comprising a plurality of the lower shield layers aligned in the track width direction; and an upper shield part comprising a plurality of the upper shield layers aligned in the track width direction,
   dummy shield layers being provided respectively on both sides in the track width direction of at least said lower shield part out of said lower shield part and said upper shield part, and
   the whole of said dummy shield layers and said lower/upper shield part having a closure magnetic-domain structure to act as a single magnetic layer.

* * * * *